(12) United States Patent
Rosa

(10) Patent No.: US 7,156,514 B2
(45) Date of Patent: Jan. 2, 2007

(54) INKS AND PRINTHEADS WITH INTERNAL CLOG PREVENTION

(75) Inventor: Dell T. Rosa, Winchester, KY (US)

(73) Assignee: Lexmark International, Inc., Lexington, KY (US)

( * ) Notice: Subject to any disclaimer, the term of this patent is extended or adjusted under 35 U.S.C. 154(b) by 280 days.

(21) Appl. No.: 10/836,414

(22) Filed: Apr. 30, 2004

(65) Prior Publication Data

US 2005/0243152 A1    Nov. 3, 2005

(51) Int. Cl.
*B41J 2/175* (2006.01)

(52) U.S. Cl. .................................... 347/100
(58) Field of Classification Search ................ 347/100
See application file for complete search history.

(56) References Cited

U.S. PATENT DOCUMENTS

| 5,620,565 | A | * | 4/1997 | Lazorisak et al. ............ 162/72 |
|---|---|---|---|---|
| 5,919,291 | A | | 7/1999 | Hotomi et al. |
| 6,003,983 | A | | 12/1999 | Lowry et al. |
| 6,537,546 | B1 | * | 3/2003 | Echigo et al. ............. 424/94.4 |
| 6,590,023 | B1 | | 7/2003 | MacMillan |
| 6,646,024 | B1 | | 11/2003 | Beach et al. |
| 6,652,634 | B1 | | 11/2003 | Akers, Jr. et al. |
| 2003/0175410 | A1 | * | 9/2003 | Campbell et al. .......... 427/2.24 |

FOREIGN PATENT DOCUMENTS

JP          02080684 A  *  3/1990

* cited by examiner

*Primary Examiner*—Stephen Meier
*Assistant Examiner*—Laura E. Martin
(74) *Attorney, Agent, or Firm*—Taylor & Aust, P.C.

(57) ABSTRACT

Active enzymes are incorporated into inks to prevent clogging. These may be just cellulase or cellulase and protease, to attack the most prevalent materials. The enzymes decompose the materials they are specific to, which degrades or solubilizes them to prevent clogging at nozzles and other flow features of a printhead.

31 Claims, No Drawings

INKS AND PRINTHEADS WITH INTERNAL CLOG PREVENTION

TECHNICAL FIELD

This invention relates to liquid inks intended to be applied through a small orifice, such as a nozzle of an inkjet printer, in which clogs in the ink are avoided.

BACKGROUND OF THE INVENTION

Modem ink jet printheads can consist of a plurality of nozzle holes, each fed by a series of passageways leading back to a larger ink reservoir. Collectively these features are described as flow features. Ink is ejected from the printhead through the nozzle holes by mechanical, thermal or other means allowing the device to form an image on a suitable media.

Because of the increasing demand for higher resolution printing, the size of these nozzle holes and flow features are being shrunk to ever smaller dimensions, permitting a smaller drop size, and hence a finer resolution image. Because of the increasing demand for greater speed when printing, the number of nozzle holes is being greatly increased on some devices. All of these progressive changes have led to an increasing sensitivity to clogging either in the nozzle or in the flow features leading to the nozzle.

Foreign debris commonly found in the manufacturing environment, particularly cellulose fibers and skin dander, are among the most common objects contaminating printheads during manufacture that will result in a nozzle clog. These debris are often larger than the dimensions of the flow features and occlude them, thereby preventing ink from feeding the firing chamber of the printhead and causing a print failure.

To minimize this from happening current manufacturing processes require the assembly of sensitive components in a cleanroom environment where particulate counts are strictly controlled. Even in these environments, however, some level of contamination still occurs. Since humans may necessarily be in the cleanroom, significant amounts of skin dander can be found in inks in printing devices processed in such cleanrooms. Similarly, paper products are so ubiquitous that significant amounts of cellulose can be found in inks in printing devices processed in cleanrooms.

Previous techniques attempt to limit the damage large particulates can cause in a printhead by filtering out the particle before it can completely occlude the nozzle or flow feature. Two common strategies are employed. One involves filtering the ink as it is drawn into the printhead from the reservoir. While effective, this will not eliminate particles pre-existing in the printhead itself from its construction.

The second strategy involves placing filter pillars before the passageway feeding the nozzle-firing chamber. The filter pillar effectively creates two paths to the firing chamber, such that if one becomes blocked, the other is still available.

DISCLOSURE OF THE INVENTION

This invention takes a completely different approach to eliminating clogs and clogging materials in printheads. The invention employs active enzymes formulated either as a primary part of the ink, or as a secondary formulation incorporated into the ink by being applied to the nozzle holes during or after manufacture. These enzymes are selected to attack and decompose materials such as cellulose, protein (dander, etc.), and polysaccharides (biofilm, starches, etc.) to soluble products. By decomposing these materials over time, they are degraded or solubilized to the extent that they are no longer able to clog the nozzle holes or flow features.

This invention employs active enzymes incorporated into existing ink formulations to produce an ink formulation which will proactively decompose and destroy various types of debris that may occlude the flow features of the inkjet printhead. The use of enzymes in any ink for the purpose of degrading and destroying various contaminants in ink is believed to be novel. Thus, this invention represents an improvement over previous ink systems that do not have an enzyme-based capacity to degrade contaminants in the marking system. This invention can also be embodied in a separate enzyme solution which is applied to the marking system where it contacts the ink, to accomplish the same purpose of destroying clogging contaminates in the ink. In use the ink may be held an inkjet printhead have small nozzles through which the ink is expelled to make dots on paper which combine to form visual images.

DESCRIPTION OF THE PREFERRED EMBODIMENTS

This invention was developed with the specific application of inkjet or other printing in mind. The current method of manufacturing an inkjet print cartridge involves substrate measures to ensure no particulate debris contaminates the sensitive ink-bearing parts during manufacture. As an example, cleanroom facilities rated at class 1000 or better are employed to reduce the quantity of airborne particulate available to contaminate the product. Even with a class 1000 cleanroom facility, there are still up to 1000 particulates per cubic foot of air, making it inevitable that some particulate contamination will occur. Chief among these particulate contamination species are cellulose, a result of paper and cardboard packaging and materials used in manufacturing; protein, typically in the form of dander from the human operators required in the manufacturing process, but also possibly from microscopic biological organisms such as bacteria, mold, yeast and algae.

As a second example, many sensitive parts, notably the printhead computer chips, are washed at several points during manufacture with deionized water to remove residues and contaminating particulates. The water itself is filtered to 0.22 μm or better as a cleaning and sterilizing step, however, experience has shown that particulate continues to exist even in this filtered water, most notably biofilm residues. Biofilm residues, owing to their slimy, deformable nature can pass easily through a 0.22 μm filter and be deposited into a printhead. These films can then agglomerate other particles making them larger, dry into a hardened particle capable of occluding a flow feature, or contain live bacteria that can then multiply and grow a colony. Biofilm residues consist of complex polysaccharide molecules and other bacterial detritus.

Enzymes commonly used in household detergents can chemically and selectively decompose all of the contaminants mentioned above. These enzymes were specifically selected by the detergent industry due to their robustness in washing solutions, their effectiveness in degrading stains composed of similar material, their inability to degrade fabric dyes, and their commercial availability. All of these properties make these enzymes very suitable for inclusion into an ink formulation.

A specific example of the present invention would employ a cocktail of three enzymes, a cellulase from *Trichoderma reesei*, available from Sigma C2730, a protease from *Bacil-* lus globigii (Bacillus licheniformis) available from Sigma P4860, and an amylase enzyme from Aspergillus oryzae available from Sigma A8220. These enzymes attack cellulose, protein and saccharides respectively. The present invention may also include other enzymes and classes of enzymes to remove yet more variations of possible contaminants.

The term "active enzyme" in this specification is intended to encompass the enzyme itself, which is normally catalytic in nature, and its cofactor (also termed "coenzyme") to support activity of the enzyme itself. An example of a cofactor is adenosine triphosphate, which provides energy. However, cofactors are specific to the enzymes they support and are widely different in form and mechanism. Commercial enzymes are normally sold combined with their cofactor.

To preserve the quality of inks for their ultimate purpose of marking, preferably no more that about 2 percent by weight of the ink is the active enzymes.

The manufacturers rate the potency of active enzymes as sold. Where the active cellulase is the foregoing product, 10 g of the active cellulase has the same potency of 3.0 g of the foregoing protease. Where the essential concerns are with cellulose and skin dander and are equal, the addition to the ink may be only cellulase and protease in the amounts of 10 g and 3 g (this necessarily includes some water, as the enzymes are sold as concentrated solutions). Where an equal concern is biofilm, the foregoing amylase is added in amount of 8.25 g, which matches the potency of each of the other two active enzymes. In each case the pH is brought to 7.7 (equaling that of the ink) with 0.1M sodium hydroxide.

The amounts may be selected to match the level of concern for specific contaminants. Often cellulose will be the major concern. Where the problem is extreme, only active cellulase may be used at the full limit of about 2 percent by weight of the ink.

Other examples of enzymes possibly desirable in ink are esterase for acrylics and methylesterase for methyl esters. However, those and other potential contaminants, such as fats, typically can be controlled best by strict restriction of materials entering the cleanroom manufacturing area of the ink.

Accordingly, various combinations or single enzyme can be used. These enzymes are added to the inks (either dye-based or pigment-based) as aqueous solutions —as obtained from Sigma—which already contain the required co-factors to allow the enzymes to function. The pH of the enzyme solutions or the inks is adjusted to maintain the proper pH level for the ink. Once mixed with ink, the enzyme containing inks can be loaded into standard printing devices using standard methods well known to those skilled in the art.

Representative ink formulas are as follows:

The following abbreviations are used in the tables:

Magenta dye—The following describes representative magenta dyes, termed MD1 below as aqueous solution having 14.7% dye by weight.

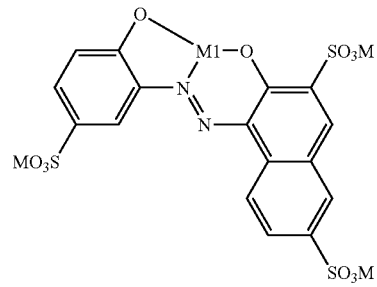

Wherein M1 comprises Cu, Ni, Fe, or Cr, and M comprises —H, —Na, —Li, —K, or an optionally substituted ammonium ion.

Sensent AR289—A commercially sold dye, 10% dye by weight in aqueous solution

Sensent AR52—A commercially sold dye, 6.6% dye by weight in aqueous solution.

Hampene Na3T —A commercially sold trisodium ethylenediaminetetracetic acid (alternatively known as trisodium EDTA), a chelating agent.

Proxel GXL—A commercially sold biocide commonly used in inkjet inks.

SILWET 7600—A commercially sold carbon, linear methyl mutiethyloxpropyl siloxane, a surfactant.

2-P—2-pyrrolidone, a cosolvent.

EG4—Tetraethylene glycol, a cosolvent.

PEG400—Polyethylene glycol, 400 weight average molecular weight, a cosolvent.

2-amino morpholine—Associates with the surface modified (self dispersant) carbon black for increased compatibility with organic components.

| Magenta Color Dye Ink | |
|---|---|
| | By Weight Percent |
| MD1 | 2.5% |
| Sensient AR 289 | 1.00% |
| Sensient AR 52 | 0.10% |
| Hampene Na3T | 0.10% |
| Proxel GXL | 0.05% |
| 1,2-Hexanediol | 3.00% |
| SILWET 7600 | 0.50% |
| 2-P | 8% |
| Tri-propylene glycol | 6% |
| Active Enzymes(s) | 2.00% |
| DI Water | Balance |

Representative yellow dyes for which the foregoing formula is representative are Acid Yellow 17, Acid Yellow 23, Direct Yellow 132, and their mixtures.

Representative cyan dyes for which the foregoing formula is representative are Direct Blue 199, Acid Blue 9 and their mixture.

Black inks generally consistent with this invention are described in U.S. Pat. No. 6,646,024 B2, assigned to the assignee of this invention. One ink is a mixture of polymer dispersed carbon black and self-dispersed carbon black, and such a mixture is an ink consistent with this invention. Dispersants consistent with this invention are described in U.S. Pat. No. 6,652,634, assigned to the assignee of this invention.

| Pigment Black Ink | |
|---|---|
| Formulation: | % by Weight |
| Self Dispersant Carbon Black | 1.90 |
| Dispersant Dispersed Carbon Black | 2.65 |
| PEG400 | 7.5 |
| 2P | 7.5 |
| 1,2 Hexanediol | 1.2 |
| 2-amino morpholine | 0.10% |
| DI Water | Balance |

Marking devices such as inkjet printheads containing clogging contaminants such as cellulose, protein or biofilm particulates that also contain an enzyme-laden ink will affect a chemical reaction, which over time will decompose the cellulose, protein or biofilm particle to soluble chemical products. This time would be the residence time of the product on the shelf while awaiting use by the customer. Thus, by the time the marking device is used, some or all of the potential clogging particulate material will have been destroyed preventing a printing failure due to these contaminants. It is even possible that a nozzle or other flow feature clogged already by a particle of this nature may become unclogged as the particulate is softened and degraded over time.

This is in contrast to a marking device with standard ink, wherein no capacity is found to destroy clogging contaminants, and sole reliance is made upon the filtering units built into the device. Filtering is not always successful. The primary filter between the printing device and the ink reservoir in an inkjet device will typically only remove fairly large particles; this is deliberately done to avoid choking the flow of ink prematurely. Filter pillars in the printhead chip are limited to retaining only one occluding particle per flow path. A second particle approaching the same flow path will result in a failure. In addition a large enough particle may occlude both flow paths around a filter pillar, or even multiple flow paths.

The printhead described in U.S. Pat. No. 6,003,983 assigned to the assignee of this invention is illustrative of inkjet printheads which print through nozzles and could beneficially employ this invention.

Reducing the overall number of possible occluding particles by enzymatic degradation during the shelf life of the product greatly reduces the number of particles that the filtering system must contend with. Fewer unwanted potentially occluding particles are desirable, as this will increase the likelihood of proper performance of the device, resulting in superior product performance during its life.

Having described the invention and embodiments thereof, it will be recognized by those of ordinary skill that the invention is capable of numerous modifications, rearrangements and substitutions without departing from the spirit and scope of the invention.

What is claimed is:

1. An inkjet ink for inkjet printers comprising coloring matter suspended in a liquid vehicle, said ink further comprising an active enzyme to decompose one or more of cellulose, protein or biofilm.

2. The ink as in claim 1 in which said ink contains as said enzyme cellulase from *Trichoderma reesei*.

3. The ink as in claim 1 in which said ink contains as said enzyme only cellulase from *Trichoderma reesei*.

4. The ink as in claim 1 in which said ink contains as said enzyme protease from *B globigii*.

5. The ink as in claim 1 in which said ink contains as said enzyme only protease from *Bacillus globigii*.

6. The ink as in claim 1 in which said ink contains as said enzyme amylase from *Aspergillus oryzae*.

7. The ink as in claim 1 in which said ink contains as said enzyme only amylase enzyme from *Aspergillus oryzae*.

8. The ink as in claim 1 in which said ink contains as said enzyme only an active enzyme to decompose cellulose and an active enzyme to decompose protein.

9. The ink as in claim 8 in which said enzyme to decompose cellulose is cellulase from *Trichoderma reesei* and said enzyme to decompose protein is protease from *Bacillus globigii*.

10. The ink as in claim 1 which contains less than about 2 percent by weight of all said active enzymes in said ink.

11. The ink as in claim 2 which contains less than about 2 percent by weight of all said active enzymes in said ink.

12. The ink as in claim 3 which contains less than about 2 percent by weight of all said active enzymes in said ink.

13. The ink as in claim 4 which contains less than about 2 percent by weight of all said active enzymes in said ink.

14. The ink as in claim 5 which contains less than about 2 percent by weight of all said active enzymes in said ink.

15. The ink as in claim 6 which contains less than about 2 percent by weight of all said active enzymes in said ink.

16. The ink as in claim 7 which contains less than about 2 percent by weight of all said active enzymes in said ink.

17. The ink as in claim 8 which contains less than about 2 percent by weight of all said active enzymes in said ink.

18. The ink as in claim 9 which contain less than about 2 percent by weight of all said active enzymes in said ink.

19. The ink as in claim 1 which contains about 2 percent by weight of all said active enzymes in said ink.

20. The ink as in claim 2 which contains about 2 percent by weight of all said active enzymes in said ink.

21. The ink as in claim 3 which contains about 2 percent by weight of all said active enzymes in said ink.

22. The ink as in claim 4 which contains about 2 percent by weight of all said active enzymes in said ink.

23. The ink as in claim 5 which contains about 2 percent by weight of all said active enzymes in said ink.

24. The ink as in claim 6 which contains about 2 percent by weight of all said active enzymes in said ink.

25. The ink as in claim 7 which contains about 2 percent by weight of all said active enzymes in said ink.

26. The ink as in claim 8 which contains about 2 percent by weight of all said active enzymes in said ink.

27. The ink as in claim 9 which contain about 2 percent by weight of all said active enzymes in said ink.

28. An inkjet printhead having small nozzles and holding the ink of claim 1 to be expelled through said nozzles to be combined to form visual images.

29. An inkjet printhead having small nozzles and holding the ink of claim 8 into be expelled through said nozzles to be combined to form visual images.

30. An inkjet printhead having small nozzles and holding the ink of claim 9 to be expelled through said nozzles to be combined to form visual images.

31. An inkjet printhead having small nozzles and holding the ink of claim 18 to be expelled through said nozzles to be combined to form visual images.

\* \* \* \* \*